(12) United States Patent
Lefevere

(10) Patent No.: US 6,609,758 B1
(45) Date of Patent: Aug. 26, 2003

(54) DEVICE FOR INDEXED ADJUSTING A MOBILE PART POSITION

(76) Inventor: Marc Lefevere, La Pommeraie, Chemin de la Fontaine, Croix (FR), F-59170

( * ) Notice: Subject to any disclaimer, the term of this patent is extended or adjusted under 35 U.S.C. 154(b) by 0 days.

(21) Appl. No.: 09/807,392

(22) PCT Filed: Oct. 12, 1999

(86) PCT No.: PCT/FR99/02464
§ 371 (c)(1),
(2), (4) Date: Jun. 6, 2001

(87) PCT Pub. No.: WO00/21784
PCT Pub. Date: Apr. 20, 2000

(30) Foreign Application Priority Data

Oct. 13, 1998 (FR) ............................................ 99 12960

(51) Int. Cl.$^7$ .............................. A47C 7/54; B60N 2/46
(52) U.S. Cl. .................................. 297/411.38; 297/367
(58) Field of Search ................................ 297/366, 367, 297/373, 411.38

(56) References Cited

U.S. PATENT DOCUMENTS

| | | | | | |
|---|---|---|---|---|---|
| 5,590,931 A | * | 1/1997 | Fourrey et al. | ......... | 297/367 X |
| 5,881,854 A | * | 3/1999 | Rougnon-glasson | .... | 297/367 X |
| 6,112,370 A | * | 9/2000 | Blanchard et al. | ...... | 297/367 X |
| 6,120,098 A | * | 9/2000 | Maygar et al. | ............. | 297/367 |
| 6,149,235 A | * | 11/2000 | Fahim | ................... | 297/367 X |
| 6,312,053 B1 | * | 11/2001 | Maygar | ...................... | 297/367 |

FOREIGN PATENT DOCUMENTS

| | | | | |
|---|---|---|---|---|
| DE | 40 22 840 | | 1/1992 | |
| EP | 0 024 976 | | 3/1981 | |
| FR | 2406752 | | 5/1979 | |
| FR | 2704661 | | 11/1994 | |
| FR | 2737263 | | 1/1997 | |
| GB | 2117440 A | * | 10/1983 | ................. 297/367 |

* cited by examiner

*Primary Examiner*—Rodney B. White
(74) *Attorney, Agent, or Firm*—Weingarten, Schurgin, Gagnebin & Lebovici LLP

(57) ABSTRACT

A device for automatic indexed guidance of a moving part (53) guided about an axis of rotation (5) on a fixed part (1) that is fixed about said axis of rotation (5), the device comprising: a toothed element (40) mounted to rock about a rocking axis (41) substantially parallel to the axis of rotation (5); a ratchet (12) defining a plurality of abutments for the toothed element (40), said abutments being angularly disposed around the axis of rotation (5); and a cam path (10) for controlling the rocking movements of the toothed element (40) about its rocking axis (41) during rotation of the moving part; said device comprising a firs rigid one-piece fixed cheek-plate (1) provided with a plurality of staged surfaces defining: the ratchet (12); the cam path (10); and at least one bearing surface (13, 14) suitable for guiding a moving plate (57) in rotation about the axis of rotation (5), the moving plate supporting the rocking axis (41) of the toothed element (40).

31 Claims, 7 Drawing Sheets

DEVICE FOR INDEXED ADJUSTING A MOBILE PART POSITION

The invention relates to a device for indexed adjustment of the position of the moving part that is suitable for being displaced in rotation about an axis relative to a support part, the support part being fixed relative to the axis.

In an embodiment of the invention, the moving part is the armrest of a seat, e.g. for a motor vehicle.

In conventional manner, such armrests are:

adjustable in angular position in a vertical plane relative to a reference plane that is generally horizontal; and retractable into a position that is conventionally located in the plane of the seat back.

Very many embodiments of devices for adjusting the position of a motor vehicle seat armrest are already known in the prior art.

By way of example, reference can be made to the following documents: DE-A-43 30 448, DE-A-42 27 871, DE-40 22 840, DE-36 11 929, EP-A-010 867, EP-A-018 662, EP-A-061 967, EP-A-104 040, U.S. Pat. No. 4,807,935, FR-A-2 406 752, FR-A-2 636 278, and FR-A-2 704 661.

Reference is made below more particularly to document FR-A-2 737 263 which stems from the Applicant.

In a first embodiment, shown in FIGS. 2 to 9 of that document FR-A-2 737 263, that prior device makes it possible, starting from a first extreme position P1 of the moving part and moving it in a first direction of rotation S1:

initially to move the moving part stepwise until it reaches an intermediate position P3; and then secondly, beyond the intermediate position P3, to move the moving part freely, in the direction of rotation S1 and also in the opposite direction S2, such that the moving part is capable:

either of being returned to its first extreme position P1 by rotating freely in the direction S2, resilient means then optionally urging the moving part in the direction S2;

or else of being taken to a second extreme position P2 by rotating freely in the direction S1, resilient means then optionally urging the moving part in the direction S2.

The incremental or step-by-step movement is provided by a ratchet mechanism having a rocking pawl with teeth, suitable for taking up the following states which are defined relative to the pawl and a ratchet disposed on a part secured to the moving part:

a state in which the teeth of the pawl are spaced apart from those of the ratchet, the moving part then being capable of being displaced freely in rotation in both directions S1 and S2;

a plurality of full thrust states in which the teeth of the pawl bear against the teeth of the ratchet, each state corresponding to a given position of the moving part which can then be displaced in the direction S1 only; and a plurality of adjustment states, in each of which only one of the teeth of the pawl is in contact with the ratchet, there being an adjustment state between each of the full thrust states during rotation of the moving part in the direction S1 between the positions P1 and P3.

A resilient member continuously urges the pawl towards the ratchet.

The part supporting the ratchet is provided with a cam path for actuating means for declutching rocking of the pawl.

The cam path has abutments which, when they bear against opposing abutments provided on the pawl, enable:

the pawl to pass from a full thrust position to the spaced-apart position during rotation of the moving part in the direction S1; and the pawl to return from its spaced-apart position to a first full thrust position by rotating the moving part in the direction S1 and returning to the first extreme position P1.

Resilient means ensure that the pawl is held in the spaced-apart position so long as the cam path has not caused the pawl to return to the full thrust position, which is obtained by rotating the moving part in the direction S2 all the way to the first extreme position P1.

In the device described by document FR-A-2 737 263, numerous housings are formed in the fixed part for receiving resilient means that act on the rocking pawl, thereby complicating implementation of such a fixed part and making a compact embodiment difficult to achieve.

In addition, the device described in document FR-A-2 737 263 has numerous parts to assemble whose dimensions, configuration, and materials give rise to high manufacturing costs.

The invention relates to a device enabling the same functions to be performed as are obtained from the first embodiment described in document FR-A-2 737 263, while being more compact and more robust, and while also making it possible:

to be removed from the armrest without tools, with no projecting portion overhanging the seat when the armrest is removed from the device;

to have an assembly with a smaller number of parts compared with prior embodiments; and to be mounted on a symmetrical armrest on a device situated on the right or the left of a seat without requiring significant modification to the device.

To this end, in a first aspect, the invention provides a device for automatic indexed guidance of a moving part guided about an axis of rotation on a fixed part that is fixed about said axis of rotation, the device comprising:

a toothed element mounted to rock about a rocking axis substantially parallel to the axis of rotation;

a ratchet defining a plurality of abutments for the toothed element, said abutments being angularly disposed around the axis of rotation; and a cam path for controlling the rocking movements of the toothed element about its rocking axis during rotation of the moving part;

said device comprising a first rigid one-piece fixed cheek-plate provided with a plurality of staged surfaces defining:

the ratchet;

the cam path; and at least one bearing surface suitable for guiding a moving plate in rotation about the axis of rotation, the moving plate supporting the rocking axis of the toothed element.

Other objects and advantages of the invention will appear on reading the following description of embodiments, which description is made with reference to the accompanying drawings, in which.

Figure 4:
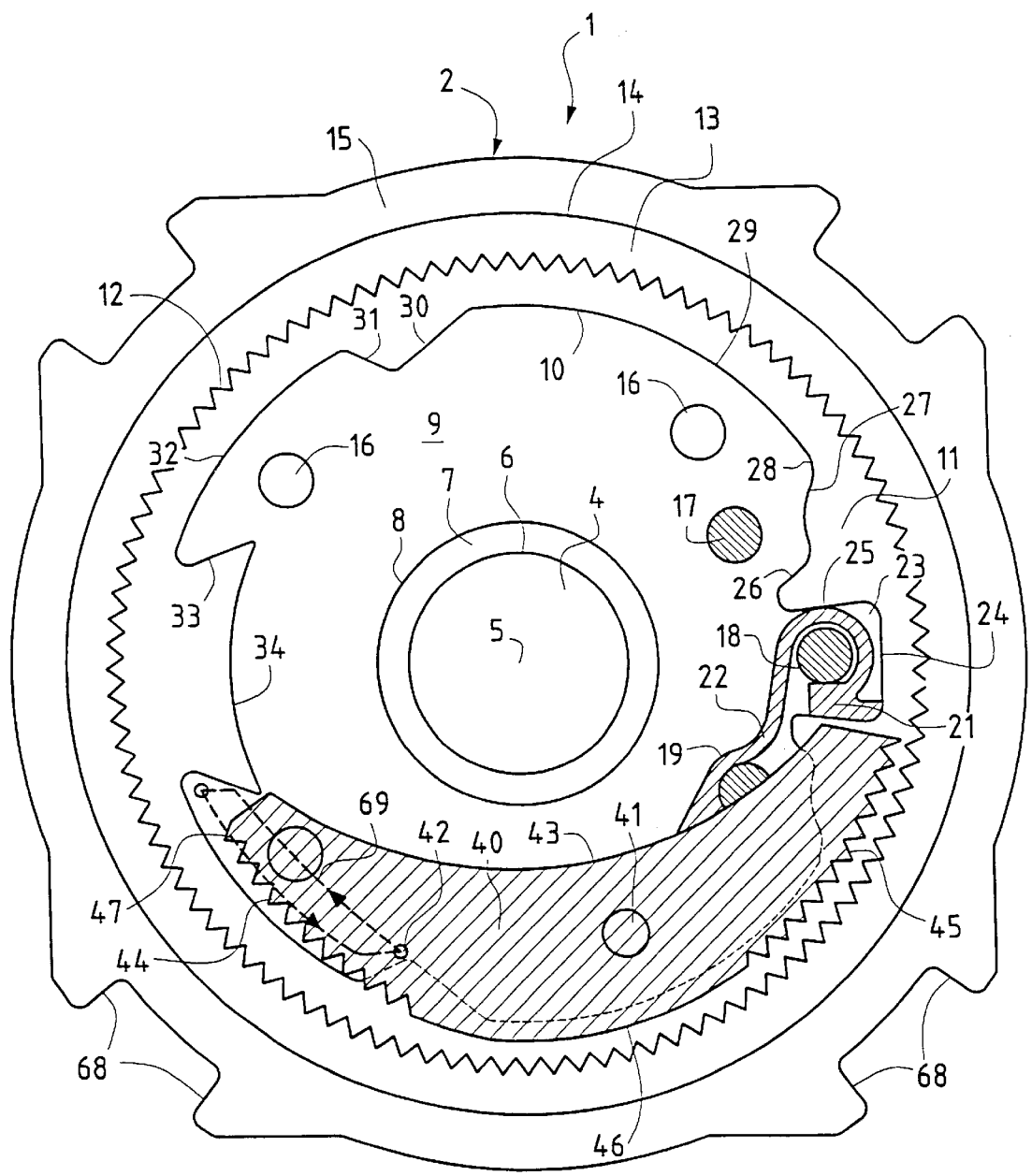
FIG. 4 is a view analogous to FIG. 2, the moving pawl being in its position where it is disengaged from the ratchet of the first fixed cheek-plate.
Figure 5:
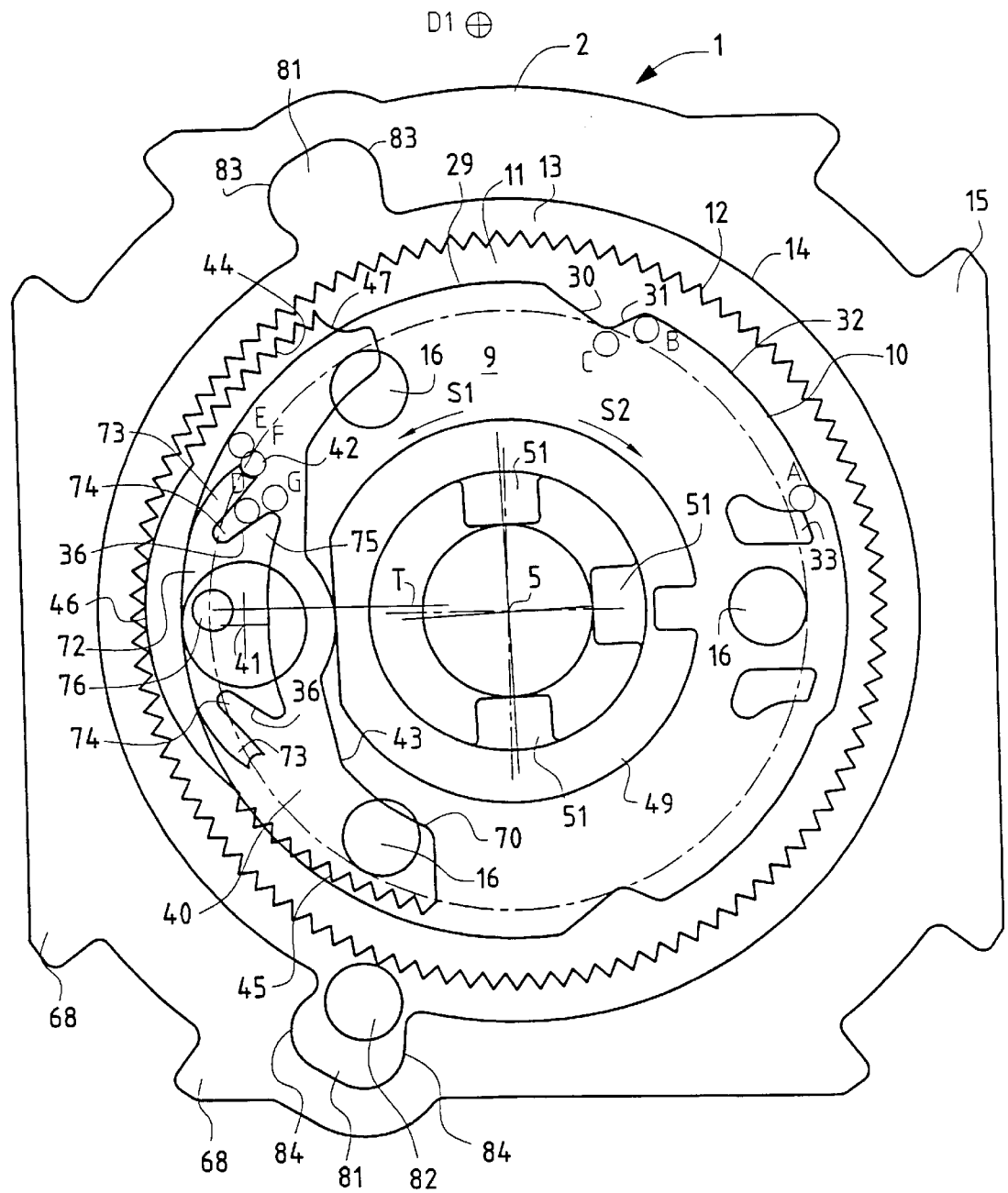
FIG. 5 is a view analogous to FIG. 1 of a second embodiment of the first fixed cheek-plate.
Figure 6:
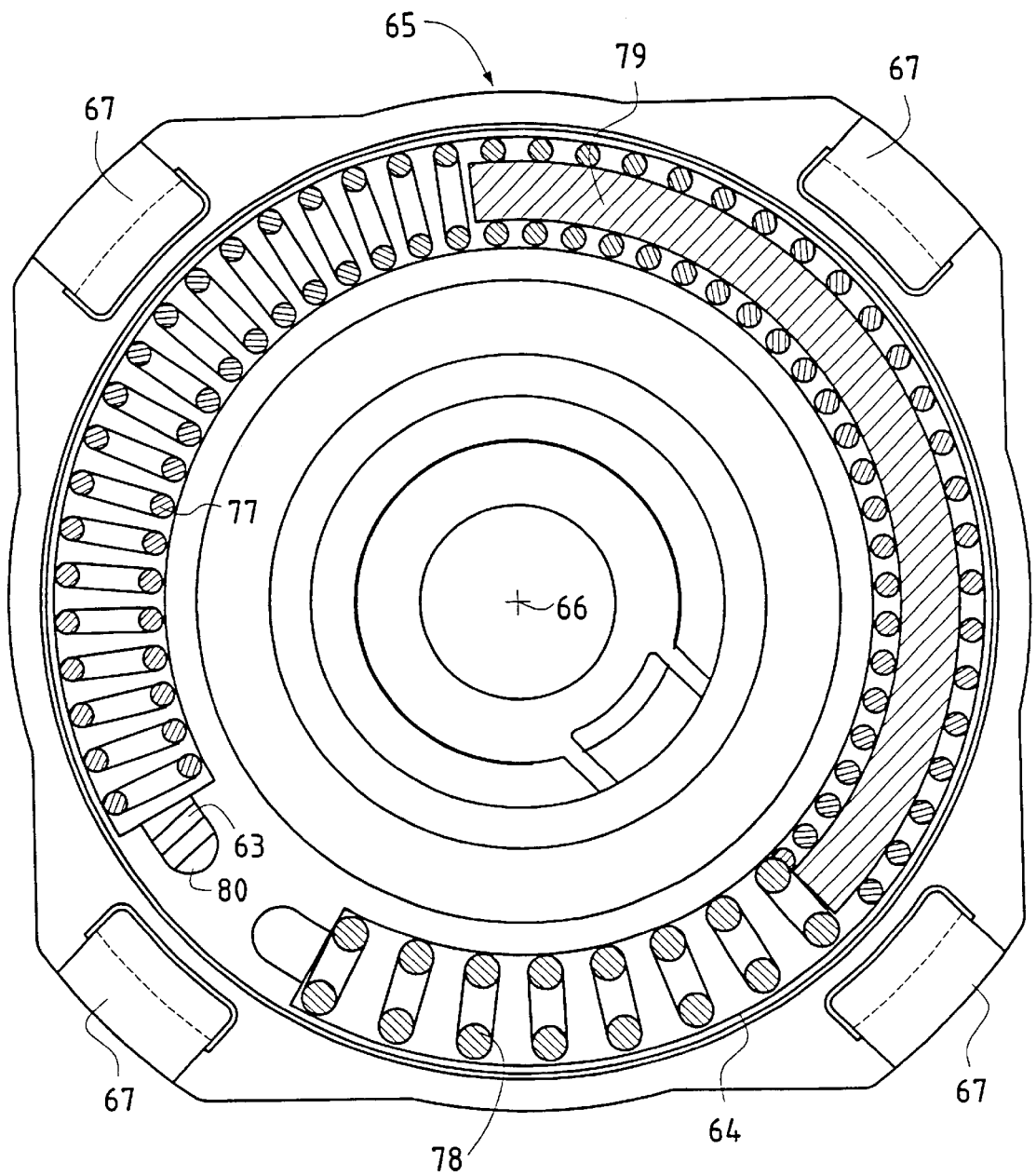
Figure 7:
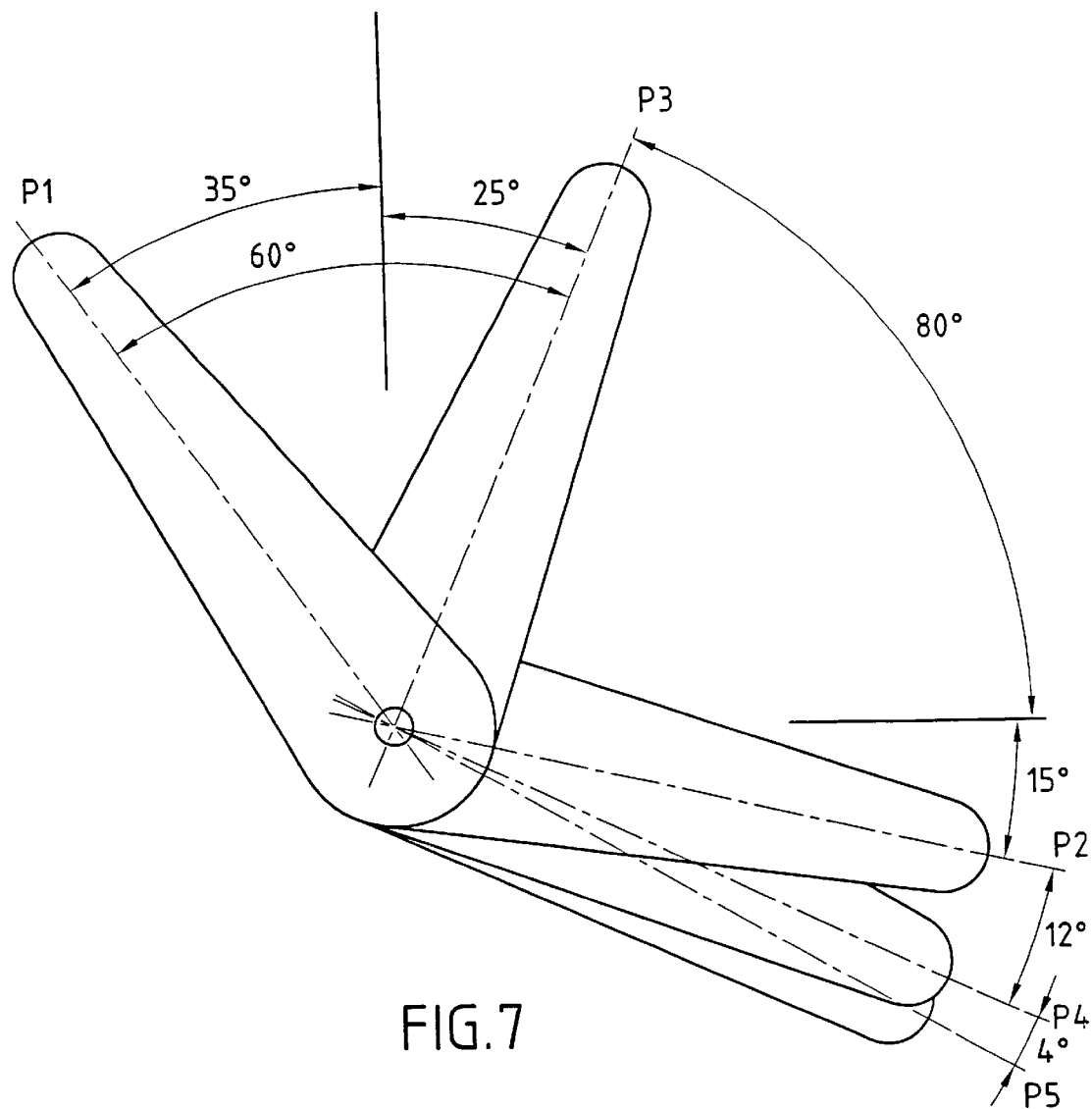

FIG. 6 is a plan view of an embodiment of the second fixed cheek-plate of a control box of the invention, the inside face of the second fixed cheek-plate being shown; and FIG. 7 is a diagrammatic side view of an armrest mounted on a device is shown in FIGS. 1 to 6, the armrest being shown in positions P1, P2, P3, P4, and P5 defined below, the angular offset vales between the positions being given only by way of indication.

Figure 1:
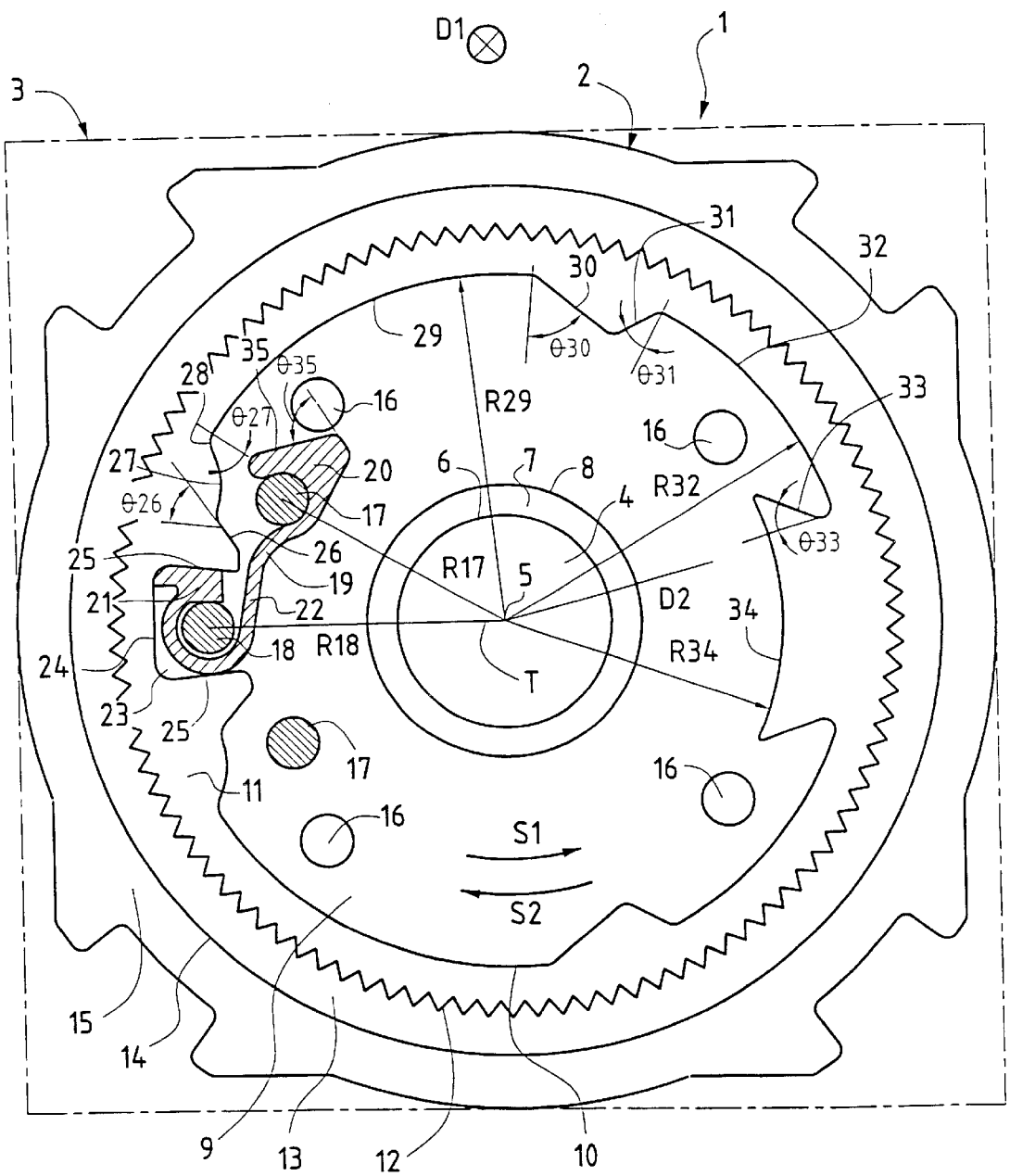
FIG. 1 is a plan view of a first fixed cheek-plate of a control box constituting an embodiment of the invention, the inside face of the cheek-plate being shown.

Reference is made initially to FIG. 1 which is a plan view of a one-piece and substantially rigid first fixed cheek-plate 1 of a control box of the invention.

FIG. 1 shows the inside face of this first cheek-plate 1 which can be made out of a material selected, as a function of the intended application, from the group comprising polymer materials, and metal alloys such as steels or aluminum alloys, for example.

In the embodiment shown, the outline of this first fixed cheek-plate 1 as shown in FIG. 1 is substantially inscribed within a square envelope 3. Nevertheless, it should be understood that this outline could be of some other shape, so as to be inscribed in an envelope that is round, oval, rectangular, or polygonal.

The first cheek-plate 1 has a through hole 4 on an axis 5 that is substantially parallel to a direction D1 perpendicular to the plane of FIG. 1.

In the description below of this first cheek-plate 1:

the term "transverse" is used with reference to planes parallel to the plane of FIG. 1;

the terms "axial" and "longitudinal" are used with reference to the axis 5;

the terms "radial" and "radius" are used with reference to directions D2 perpendicular to the axis 5; and the terms "inner" and "outer" etc. are used as a function of relative distances from the axis 5.

In the embodiment shown, the axis 5 is located substantially at the center of the square envelope 3.

In other embodiments (not shown), the axis 5 is off-center relative to the envelope in which the outline 2 of the first fixed cheek-plate 1 is inscribed.

Starting from the axis 5 and going radially outwards over the first fixed cheek-plate 1 towards its outline 2, the following are encountered:

the cylindrical edge 6 about the axis 5 of the through hole 4;

a first bearing surface 7 formed by a substantially transverse annular surface defined inwardly by the cylindrical edge 6 and outwardly by a cylindrical edge 8 about the axis 5;

a substantially transverse wall forming the cheek 9 of the first fixed cheek-plate 1;

a cam path 10 formed by a surface extending substantially perpendicularly to the cheek 9 of the first fixed cheek-plate 1;

a second substantially transverse bearing surface 11 defined on the inside by the cam path 10 and on the outside by an annular ratchet 12 about the axis 5;

a third substantially transverse bearing surface 13 defined on the inside by the ratchet 12 and on the outside by a wall 14 that is annular about the axis 5; and a fourth substantially transverse bearing surface 15 that is defined on the inside by the annular wall 14 and on the outside by the outline 2.

Starting from the first bearing surface 7 and going radially towards the outline 2, a plurality of staged bearing surfaces 11, 13, and 15 of the first fixed cheek-plate 1 are thus encountered, said bearing surfaces 11, 13, and 15 being substantially parallel to the wall forming the cheek proper 9.

In the embodiment shown, the cheek 9 has four substantially longitudinal threaded through holes 16 enabling the first cheek-plate 1 to be secured by screws to a support such as a car seat back (not shown), for example.

In other embodiments (not shown), the first fixed cheek-plate 1 can be secured to a support by any means selected from the group comprising: bolts, rivets, welding, adhesive, or any other equivalent means.

The cheek 9 carries at least two studs 17 and 18 projecting substantially axially therefrom, onto which there is clipped a spring part 19.

The disposition of the studs 17 and 18 and of the part 19 is described below in greater detail with reference to the embodiment shown in FIG. 1.

The spring part 19 can be made from a material selected from the group comprising metal alloys and polymer materials.

The axial extent of the studs 17 and 18 is less than or equal to that of the cam path 10.

In the embodiment of FIG. 1, three studs 17 and 18 enable the spring part 19 to be installed in two different configurations that are symmetrical about a plane T containing a direction D2 and perpendicular to FIG. 1. Only one of these assembly configurations for the spring part 19 is shown in the figures.

In other embodiments (not shown), only two studs 17 and 18 are provided, in which case there is only one possible disposition for the spring part 19.

In the embodiment of FIG. 1, two proximal studs 17 are disposed at a radius $R_{17}$ which is shorter than the radius $R_{18}$ on which the distal third stud 18 is disposed.

The spring part 19 extends over an axial extent that is less than or equal to that of the cam path 10. The spring part 19 has a hook shape at each of its two ends, each hook being pressed against a portion of the side surface of a corresponding stud 17 or 18.

When the spring part 19 is in its non-deformed position, as shown in FIG. 1, its first end portion 20 is thus pressed against a portion of the side surface of a proximal stud 17.

The other end portion 21 of the part 19 is still held pressed against a portion of the side surface of the distal stud 18.

Between its two thick end portions 20 and 21, the spring part 19 has an intermediate segment 22 of thickness that increases on going from the first end portion 20 towards the second end portion 21.

A first portion of the intermediate segment 22 is substantially concentric about the distal stud 18 and is placed at a distance therefrom.

The second portion of the intermediate segment 22 extends between the distal stud 18 and a proximal stud 17, and is curved with its concave side facing inwards.

The distal stud 18 is placed in a groove 23 that is open towards the axis 5 and that is defined by curved portions of the cam path 10.

In the embodiment shown, the groove 23 has a transverse profile comprising:

a base wall 24 that is substantially in the form of a circular arc about the axis 5; and two substantially radial side walls 25.

The opening of the groove 23 is thus smaller in size than is its base wall 24.

In the embodiment shown, the first portion of the intermediate segment 22 of the part 19 does not press against the side wall 25 of the groove 23, while the second end portion 21 of the part 19 is nevertheless prevented from moving by bearing against the following three items:

a side wall 25 of the groove 23;

the base wall 24 of the groove 23; and the side surface of the distal stud 18.

The spring part 19 is thus held in position by its second end portion 21.

However, since the first end portion 20 is not held in position relative to the proximal stud 17, the spring part 19 can be deformed because of its elasticity, said deformation corresponding to the spring part 19 rotating about an axis that is substantially as defined by the distal stud 18.

The purpose of such deformation is explained below.

The first fixed cheek-plate 1 having the spring part 19 fitted thereon is symmetrical about the above-defined plane T when seen in the plan view of FIG. 1.

The cam path 10 is described below in greater detail, taking this symmetry into account.

Starting from one of the side walls 25 of the groove 23 and going round the cam path 10 in a clockwise direction, the following are encountered:

a fillet connecting to a first plane surface 26 inclined at an angle $\theta_{26}$ relative to a radius;

a second plane surface 27 inclined at an angle $\theta_{27}$ relative to a radius;

a third plane surface 28 inclined at an angle $\theta_{28}$ relative to a radius;

a first angular sector 29 forming an arc of a circle about the axis 5 and having a radius $R_{29}$;

a fourth plane surface 30 inclined at an angle $\theta_{30}$ relative to a radius;

a fifth plane surface 31 inclined at an angle $\theta_{31}$ relative to a radius;

a second angular sector 32 constituting a circular arc about the axis 5 having a radius $R_{32}$ substantially equal to above-defined radius $R_{29}$;

a sixth plane surface 33 inclined at an angle $\theta_{33}$ relative to a radius; and a third angular sector 34 extending at a radius $R_{34}$ that is less than above-defined radius $R_{29}$.

In an embodiment, the angle $\theta_{26}$ is about 15°, the angle $\theta_{27}$ is about 80°, the angle $\theta_{28}$ is about 45°, the angle $\theta_{30}$ is about 50°, the angle $\theta_{31}$ is about 15°, and the angle $\theta_{33}$ is about 45°.

The person skilled in the art will be able to adjust the values of the above angles to take account of the functions of the cam paths 10 as described in detail below.

Figure 2:
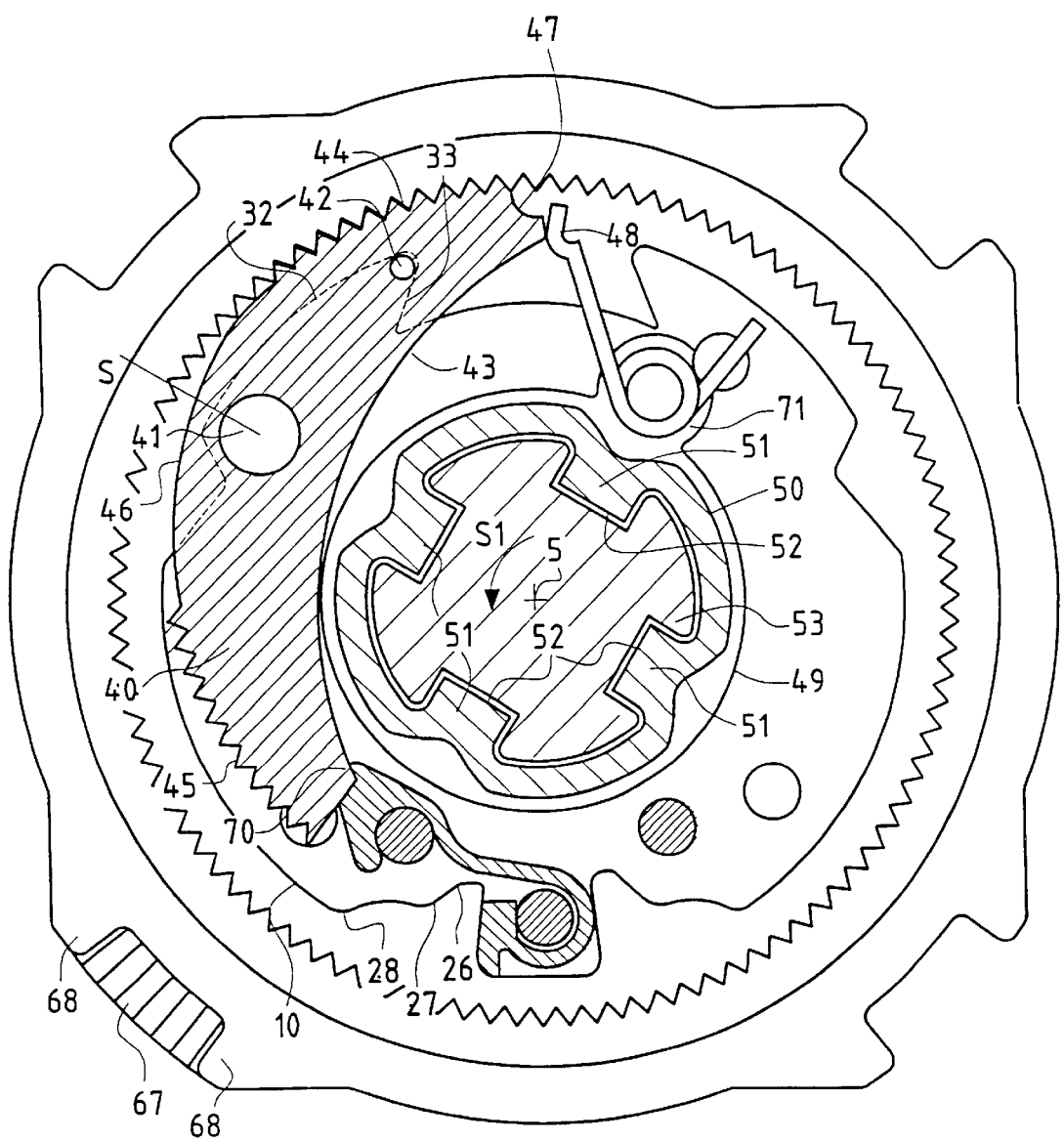
FIG. 2 is a view analogous to FIG. 1, two parts being shown in one of their operating positions relative to the first fixed cheek-plate.

Reference is now made to FIG. 2 which shows a rocking pawl 40 that can rock about an axis 41, said rocking axis 41 being suitable for being rotated about the axis 5, and the pawl being shown in a first position.

The rocking pawl 40 in the embodiment shown is a substantially plane element extending transversely over the first fixed cheek-plate 1, and it is generally crescent-shaped.

The axial thickness of the pawl 40 is less than or equal to that of the ratchet 12.

At least a portion of a transverse face of the pawl 40 rests against the second bearing surface 11, and this is true for all possible movements of the pawl 40.

The pawl 40 is provided on one of its transverse faces with a stud 42 projecting substantially axially.

As can be seen below, the stud 42 forms a cam-follower finger for reading the cam path 10.

In order to make the drawings easier to read, the moving plate supporting the rocking pawl 40 is not shown in FIG. 2.

The rocking pawl 40 has an overall plane of symmetry S that is perpendicular to the plane of FIG. 2.

The outline of the pawl 40 substantially perpendicular to the plane of FIG. 2 comprises:

a curved surface 43 forming a long inside edge;

on a long outside edge, two surfaces 44 and 45 with teeth at opposite ends of a curved surface 46 without teeth; and an abutment 47 against at least one of the two side edges interconnecting the inside and outside edges of the pawl 40.

The teeth of the surfaces 44 and 45 are complementary in shape to the teeth of the ratchet 12.

In the position shown in FIG. 2, the stud 42 of the rocking pawl 40 is placed at a short distance from the surfaces 32 and 33 of the cam path 10 and the teeth of the first toothed surface 44 of the pawl 40 press against those of the ratchet 12.

This thrust is maintained by resilient means 48, for example a spring blade, carried by a part 49 that rotates together with the moving plate 57 that supports the pawl 40.

Starting with the position shown in FIG. 2, the rocking pawl 40 can be rotated about the axis 5 in one direction only, S1.

Figure 3:
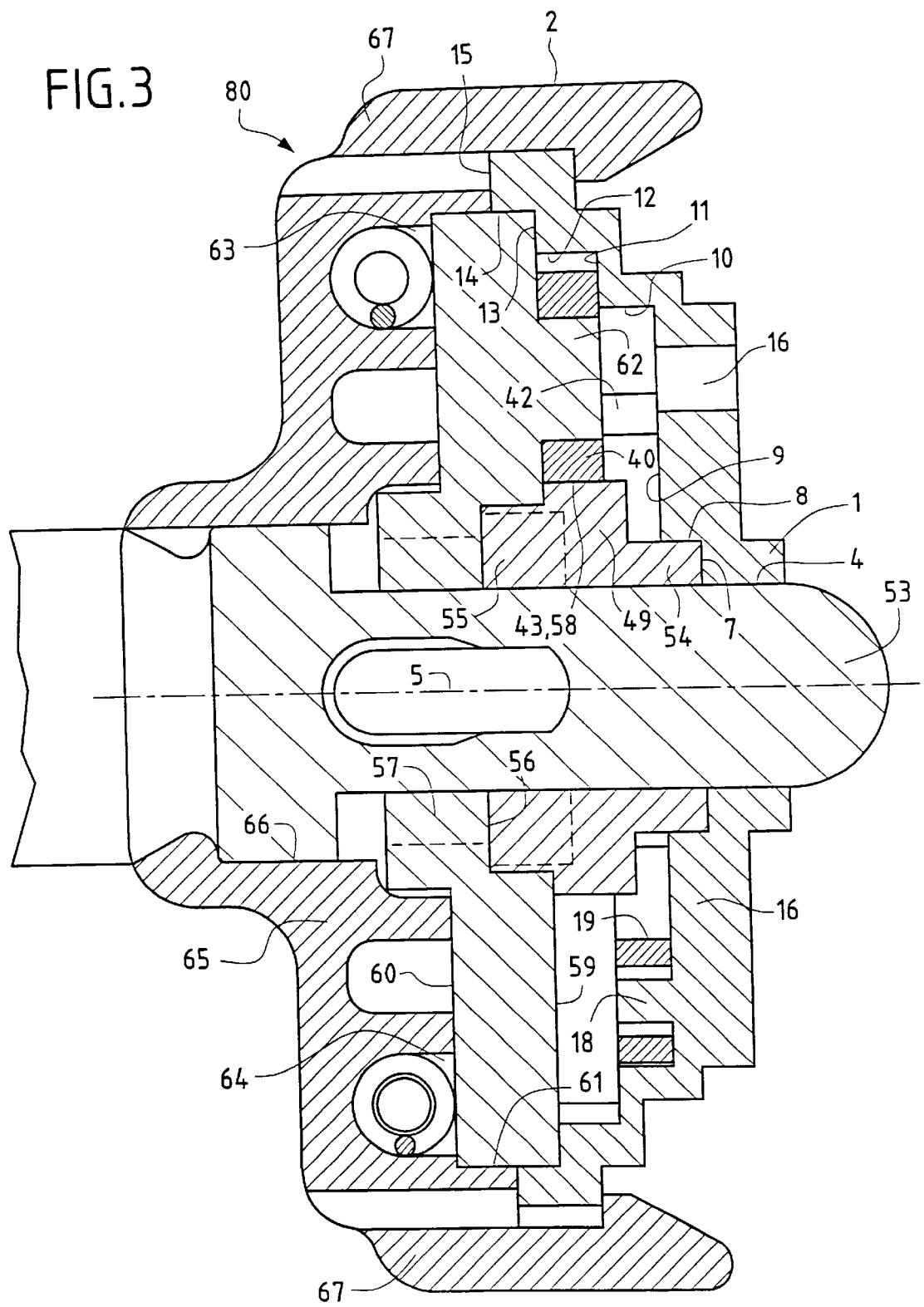
FIG. 3 is a cross-section through a box constituting an embodiment of the invention.

The entire box assembly is described below with reference to FIG. 3 et seq.

The support part 49 is provided with a central through hole 50 whose side surface is provided in one embodiment with longitudinal projections 51 for cooperating with corresponding fluting 52 in a moving shaft 53 on the axis 5.

In another embodiment, the side surface of the central through hole 50 is provided with means for clamping onto the shaft 53 resiliently so as to attenuate the rattling associated with the operating clearances of the device.

The support part 49 comprises:

a first annular end portion 54 bearing in rotary manner against the first bearing surface 7 of the fixed cheek-plate 1;

a second end portion 55 bearing in fixed manner against a central bearing surface 56 about the axis 5 on the moving plane 57; and a longitudinal side surface 58 which at all points remains at least slightly apart from the inside edge 43 of the rocking pawl 40.

The moving plate 57 is a pivoting part or middle part of the box.

In the embodiment shown, this moving plate 57 is a solid part having two transverse faces 59 and 60, and an annular longitudinal edge 61 about the axis 5 interconnecting these two faces 59 and 60.

The outer side edge of the first transverse face 59 bears against the third bearing surface 13, the annular longitudinal edge 61 bearing against the annular wall 14 of the first fixed cheek-plate 1.

The first transverse face 59 carries a longitudinally projecting stud 62 that forms the axis on which the pawl 40 rocks.

The second transverse face 60 of the moving plate 57 carries a longitudinally projecting stud 63 which, when the box BO is in the assembled position, is located in an annular groove 64 of a second fixed cheek-plate 65.

Resilient means such as springs are located in this annular groove 64 to perform a function that is described in detail below.

The moving plate 57 has a central through hole on the axis 5 whose annular edge is provided with longitudinal projections for bearing in the fluting 52 of the shaft 53.

The second fixed cheek-plate 65 is provided with a through hole 66 allowing the shaft 53 to pass therethrough.

In the embodiment shown, the second fixed cheek-plate 65 is a backing piece snap-fastened to the first fixed cheek-plate 1 by four resilient tabs 67, the second fixed cheek-plate 65 being made of a polymer material that is injected or molded.

Abutments 68 provided on the outline 2 of the fixed cheek-plate 1 serve to prevent relative displacement between the two fixed cheek-plates 1 and 65, in particular in rotation about the axis 5.

Other assembly means for the two fixed cheek-plates 1 and 65 could be provided in addition to or instead of the tabs 67, in particular when the second fixed cheek-plate 65 is made of metal.

The second fixed cheek-plate 65 is provided with a bearing surface for preventing movement in translation and for guiding the moving plate 57 in rotation.

The operation of a box BO is described below, starting from the position shown in FIG. 2 for the pawl 40.

This position corresponds to the position P1 in which the shaft 53 can turn in one direction only S1.

Manual action on the shaft 53 in the direction of rotation S1 leads to the moving plate 57 being rotated, and consequently to the following rotating about the axis 5:

the support part 49 bearing via a projection against the bearing surface 56; and the rocking pawl 40 mounted on the stud 62.

During this rotation, the teeth of the first toothed surface 45 of the rocking pawl 40 are urged towards those of the ratchet 12, still under drive from the resilient means 48.

Starting from the position P1 shown in FIG. 2, rotation of the shaft 53 will thus lead to the rocking pawl 40 moving tooth by tooth so long as the stud 42 is traveling along the second angular sector 32.

Travel from one tooth to the next by rotation along S1 is associated with the pawl 40 rocking for each incremental position reached, with rotation in the opposite direction S2 being impossible.

By way of example, incremental adjustment can be obtained over 60° with a step size of about 4° to 5°.

When the stud 42 reaches the surface 31 of the cam path 10, the pawl 40 is caused to pivot about the axis defined by the stud 62 so that the first toothed surface 44 of the pawl 40 is moved away from the ratchet 12. The pawl is held in this spaced-apart position by the movement of the abutment 47 of the pawl 40 over the resilient means 48.

The pawl 40 is then in the position shown in FIG. 4 and the shaft 53 is in a position P3.

It is then possible to rotate the shaft 53 freely in both directions S1 or S2, in order:

either to return to the above-defined position P1 with the stud 42 of the pawl 40 following the same path, such as the path referenced 69 in FIG. 4, for example, in which case contact between the stud 42 and the sixth surface 32 of the cam path 10 causes the pawl 40 to return to its FIG. 2 position;

or else to go all the way to a position P2 in which rotation in the direction S1 remains possible, while rotation in the direction S2 is prevented.

The position P2 is reached when the stud 42 meets the inclined surface 35 defining the first end portion 20 of the part 19.

Because of the angle of inclination $\theta_{35}$ of the surface 35, measured relative to a radius, and because of the length of the surface 35, the pawl 40 is forced to return into a position where its first toothed surface 44 bears against the ratchet 12.

As a result, rotation of the shaft 53 is blocked for the same reasons as when moving tooth by tooth between the positions P1 and P3.

If rotary fore is applied to the shaft 53 in the direction S1, starting from this position P2, then the stud 42 of the pawl 40 will encounter the second surface 27, thereby placing the pawl 40 in a position that is spaced apart from the ratchet 12, in a manner analogous to that described above for passage of the stud 42 over the surface 31.

The shaft 53 is then in position P4.

Starting from this position P4, it is possible:

to return the shaft 53 to the position P1 by rotating freely in the direction S2; or to bring the shaft 53 into an extreme position P5 by free rotation of small amplitude in the direction S1.

This position P5 corresponds to the following set of characteristics that define the end of a stroke, even when a large force is applied in the S1 direction of rotation: contact between the stud 42 of the pawl 40 and the first surface 26 of the cam path 10 which enables thrust between the second toothed surface 45 of the pawl 40 against the ratchet 12.

In a variant embodiment, the cam path 10 is provided at the end of the first surface 26 with an end-of-stroke abutment.

Starting from the position P5 and actuating the shaft in the direction S2, passing into the position P4 leads to the toothed surfaces of the pawl 40 being spaced apart from the ratchet 12, with this spacing being retained by the resilient means 48.

Unlocking from the position P2 is obtained, for example in the case of an application to a car armrest, by declutching the rocking pawl 40 because of the armrest being pushed rearwards, the position P2 corresponding substantially to the armrest being in alignment with the seat back.

In all, the pawl can be placed in three different stable states:

a first state in which the first toothed surface 44 of the pawl 40 bears against the ratchet 12 of the first fixed cheek-plate 1. This first state is that corresponding to the stable positions from P1 included to P3 excluded, and also corresponding to position P2;

a second state in which the pawl is not in contact with the ratchet 12, this spacing apart being retained by the abutment 47 of the pawl 40 being reversibly locked against a portion of the profile of the resilient means 48. This second state corresponds to the positions P3 and P4 and the shaft 53; and a third state in which the second toothed surface 45 of the pawl 40 bears against the ratchet 12 of the first fixed cheek-plate 1. This third state corresponds to the extreme position P5.

Between the positions P1 and P3, e.g. over about 35°, it is possible to adjust the angle of rotation of the shaft 53, tooth by tooth, with passage from one tooth to the next being obtained by the pawl 40 rocking a little.

Passage from one tooth to another can correspond, for example, to rotation through an angle of about 4° to 5°.

The full stroke from P1 to P5 can correspond, for example, to an angle of about 140°, with the positions P4 and P5 being a few degrees apart.

In the embodiment shown, the ratchet 12 is provided with teeth that are substantially identical over its entire extent, and the cam path 10 has two symmetrical half cam paths about the plane T, with only one of the half cam paths being used.

In other embodiments (not shown), the teeth disposed on the semicircle of the ratchet 12 corresponding to one half cam path are different from those disposed on the other semicircle, thus making it possible, for example, to assemble the device with two different angular step sizes between teeth, depending on which half cam path is used.

In such embodiments, when the pawl 40 has two toothed surfaces, the second toothed surface is naturally adapted to bear against the ratchet 12, where appropriate, when the position P5 has been reached.

In further embodiments (not shown), the teeth are present on the ratchet 12 only in zones that correspond to the positions P1 to P3, P2, and P5.

In other embodiments (not shown), the two half cam paths are not symmetrical, or indeed the first fixed cheek-plate has only one cam path, which path extends over an angular sector greater than that of the half cam path as described above.

In other embodiments, a piece of polymer material fastened to the first fixed cheek-plate 1 forms at least a portion of the cam path 10.

Reference is now made to FIG. 5 which shows a variant embodiment of the first fixed cheek-plate 1.

In FIG. 5, elements analogous to those described above are given the same numeral references and they are not described again.

For simplification purposes, in FIG. 5:

the resilient means 48 is not shown; and a resilient part 72 is drawn with continuous lines even though it is placed beneath the rocking pawl 40 whose stud 42 is placed in the position referenced F.

The shapes and the functions of the resilient part 72 are described in detail below.

In FIG. 5, references A, B, C, D, E, and F correspond to positions of the stud 42 of the pawl 40 relative to the cam path 10.

Position A is analogous to the position described above with reference to FIG. 2 and is associated with position P1.

Position C corresponds to position P3 of the shaft 53.

When the stud 42 travels along the cam path from A towards B (second angular sector 32), the pawl 40 travels over the teeth of the ratchet 12 of the first cheek-plate 1, thereby making it possible to adjust the angular position of the shaft 53 incrementally.

When the stud 42 passes from B towards C, then the teeth of the pawl 40 are spaced apart from the ratchet 12, and the shaft 53 is then free to rotate in either direction S1 or S2 in a manner analogous to that described above with reference to FIGS. 1 to 4.

Starting from position P3 (point C), rotation of the shaft 53 in the direction S1 leads to the stud 42 coming into contact at D with an incline 36 of the resilient part 72, the stud 42 then passing to the bottom of a groove 74. In this position, the teeth of the pawl 40 are not in contact with the ratchet 12 and the resilient means 48 exerts pressure on the pawl 40.

This resilient part 72 forms a flexible cam and it can be made of a material selected from the group comprising metal alloys and polymers.

Starting from this position at the bottom of the groove 74, if rotation in the direction S2 is applied to the shaft 53, the flexibility of the arm 73 of the resilient part 72 enables the stud 42 of the pawl 40 to come into position E, in which the first toothed surface 44 of the pawl 40 bears against the ratchet 12.

The shaft 53 is then placed in position P2.

Starting from position P2 (point E), rotation of the shaft 53 in the direction S1 leads to the stud 42 being moved, by disengaging the toothed sector 44, from position E to position F and then G, which corresponds to position P5 for the shaft 53.

Rotation in direction S1 beyond position P5 is prevented by a mechanism analogous to that described above with reference to FIGS. 1 to 4: contact between the second toothed surface 45 of the pawl 40 and the ratchet 12.

In the embodiment shown in FIG. 5, the resilient part 72 forming a flexible cam is:

secured to the first fixed cheek-plate 1 by being mounted on a stud 76 projecting from the cheek 9; and provided with a plane of symmetry that cooincides with the overall plane of symmetry T of the first fixed cheek-plate 1.

In other embodiments (not shown), the part 72 is not symmetrical about the plane T and/or the first fixed cheek-plate 1 does not have such a plane of symmetry T.

The resilient means contained in the groove 64 of the second fixed cheek-plate 65 are described below with reference to FIG. 6.

As mentioned above, a stud 63 of the moving plate 57 is movable in the groove 64 during rotation of the shaft 53.

As it moves, the stud 53 compresses resilient means placed in the groove 64.

In the embodiment shown, these resilient means comprise first and second helical compression springs 77 and 78 that are in series, i.e. that are placed end to end, so as to bear at least indirectly against each other via one end.

The first spring 77 at rest extends over an angular sector that is greater than that over which the second spring 78 extends when at rest.

The stiffness of the first spring 77 is less than that of the second spring 78 and it has a curved rod 79 housed in its turns.

The diameter of this rod 79 is such as to prevent it from being able to penetrate into the turns of the second spring 78.

When the shaft 53 is in position P1, the stud 63 is placed in a housing 80 of the groove 64.

Under drive from the shaft 53 rotating in the direction S1, the first spring 77 is compressed until the turns of the first spring 77 are touching, with this state corresponding substantially to the first spring having a compressed length equal to the length of the rod 79.

If, on reaching this compression state of the first spring 77, the shaft 53 continues to rotate in direction S1, then the rod 79 will tend to compress the second spring 78 which is very stiff.

As a result, the torque applied on the shaft 53 does not damage the first spring 77.

The springs 77 and 78, and the groove 64 are disposed in such a manner that movement of the shaft 53 from position P1 to position P5 takes place against an increasing return force, with maximum force in position P5.

A control box BO as described above can be used in particular for adjusting seat armrests, e.g. in car seats.

In this application:

the first spring 77 can be placed to oppose first resilient resistance to displacement of the armrest from a low extreme position (P1) in particular a position close to horizontal, towards a high position;

the second spring 78 can be disposed so as to oppose additional resilient resistance to rotation in direction S1 such that:

it forms a marker that indicates the armrest is about to be locked in its high position (P4); and it opposes considerable resistance to displacement of the armrest towards its extreme position P5 for unlocking.

In the embodiment shown in FIG. 5, the first cheek-plate 1 is provided with two housings 81 each of which can receive inertial type rotation-preventing means 82.

In the application to car armrests, the means 82 can prevent movement when the armrest is in its raised position.

Under such circumstances, the means 82 serve to prevent the armrest returning to the horizontal position in the event of the vehicle decelerating suddenly.

In the embodiment shown, the housings 80 and 81 are provided with side walls 83 and 84 on which plastic abutments (not shown) are provided forming tracks for guiding a rolling member 82 such as a ball, the plastic abutments enabling the guide tracks to be symmetrical relative to an axis of symmetry disposed along the seat back, i.e. 20° to 25° relative to the vertical.

The cylindrical peripheral face of the moving plate 57 has at least one cavity disposed to prevent rotation of the moving plate 57 when it is in a determined orientation.

A box of the kind described above turns out to be very robust and highly compact.

What is claimed is:

1. A device for automatic indexed guidance of a moving part guided about an axis of rotation fixed part that is fixed about said axis of rotation, the device comprising:
    a toothed element mounted to rock about a rocking axis substantially parallel to the axis of rotation;
    a ratchet defining a plurality of abutments for the toothed element, said abutments being angularly disposed around the axis of rotation; and
    a cam path for controlling rocking movements of the toothed element about its rocking axis during rotation of the moving part; and
    a first rigid one-piece fixed cheek-plate provided with a plurality of staged surfaces defining
        the ratchet,
        the cam path, and
        at least one bearing surface guiding a moving plate in rotation about the axis of rotation, the moving plate supporting the rocking axis of the toothed element.

2. A device for automatic indexed guidance of a moving part guided about an axis of rotation on a fixed part that is fixed about said axis of rotation, the device comprising:
    a toothed element mounted to rock about a rocking axis substantially parallel to the axis of rotation;
    a ratchet defining a plurality of abutments for the toothed element, said abutments being angularly disposed around the axis of rotation;
    a cam path for controlling rocking movements of the toothed element about its rocking axis during rotation of the moving part; and
    a first rigid one-piece fixed cheek-plate provided with a plurality of staged surfaces defining
        the ratchet,
        the cam path, and
        at least one bearing surface guiding a moving plate in rotation about the axis of rotation, the moving plate supporting the rocking axis of the toothed element
    and wherein the first fixed cheek-plate has a through hole about the axis of rotation enabling at least a portion of the shaft of the moving part to pass therethrough, the first fixed cheek-plate further comprising, starting from the axis of rotation and going radially outwards towards an outline of the first fixed cheek-plate:
    a first bearing surface formed by a substantially transverse annular surface inwardly defined by the cylindrical edge of the through hole and outwardly defined by a cylindrical edge about the axis of rotation;
    a substantially transverse wall forming a cheek wall of the first fixed cheek-plate;
    a cam path formed by a surface extending substantially perpendicularly to the cheek wall;
    a second substantially transverse bearing surface inwardly defined by the cam path and outwardly defined by a toothed ratchet that is annular about the axis of rotation;
    a third substantially transverse bearing surface inwardly defined by the ratchet and outwardly defined by an annular wall about the axis of rotation; and
    a fourth substantially transverse bearing surface inwardly defined by the annular wall and outwardly defined by the outline of the first fixed cheek plate.

3. A device according to claim 2, characterized in that the cam path comprises two half cam paths that are substantially symmetrical about a plane (T) perpendicular to the cheek wall of the first fixed cheek plate.

4. A device according to claim 3, further comprising:
    a resilient part mounted on the first fixed cheek plate, said resilient part including an inclining surface causing the toothed element to rock so as to prevent the moving part from turning in one direction of rotation;
    a moving plate in the form of a generally disk-shaped part provided:
    with a through hole through which the shaft of the moving part passes; and
    means for enabling the moving plate to be prevented from rotation relative to said rotary shaft;
    the moving plate being also provided on a first transverse face with a stud defining the rocking axis of the toothed element;
    the toothed element is a substantially planar part provided with:
    an axial hole mounted on the stud of the moving plate;
    a stud projecting from a transverse face, said stud forming a cam-follower finger for reading the cam path during rotating of the moving plate relative to the first fixed cheek-plate; and
    teeth over at least a first side surface, said teeth being substantially complementary in shape to the teeth of the ratchet of the first fixed cheek-plate;
    the toothed element is provided with an overall plane of symmetry (S), having first and second toothed surfaces disposed on an outer side surface of said toothed element;
    the toothed element further includes a support part about the axis, the support part being mechanically linked to the moving plate so as to be rotated together therewith during movement of the shaft, said part supporting resilient return means for the toothed element;
    the resilient return means is a flexible blade provided with an abutment, the toothed element being provided with an abutment of complementary shape such that said toothed element can occupy the following stable states:
    a first state in which the first toothed surface of the toothed element bears against the ratchet of the first fixed cheek-plate;
    a second state in which the toothed element is not in contact with the ratchet, said spacing apart being conserved by reversible locking of the abutment against the complementary profile of the resilient means; and
    a third state in which the second toothed surface of the toothed element bears against the ratchet of the first fixed cheek-plate;
    further comprising a second fixed cheek-plate provided with a through hole enabling the shaft of the moving part to pass therethrough, said second cheek-plate being suitable for being secured to the first fixed cheek-plate so as to form a box (BO) in which there is housed the rotary assembly constituted by:

the moving plate;

the toothed element that rocks on the moving plate about the axis; and the support part for supporting the resilient return means;

the second fixed cheek-plate is snap-fastened onto the first fixed cheek-plate so as to retain said rotary assembly;

after the first and second fixed cheek-plates have been fixed together, the bearing surfaces of the first fixed cheek-plate serve as follows:

for the first bearing surface to guide the support part in rotation about the axis and to prevent the support part from moving in translation;

for the second bearing surface to bear against at least a portion of a transverse surface of the toothed element; and for the third bearing surface to guide the moving plate in rotation about the axis and to prevent the moving plate from moving in translation;

the moving plate comprises a stud projecting from a transverse face placed facing the second fixed cheek-plate, the stud being received in a holding bearing surface formed in the second fixed cheek-plate, the stud constituting an abutment for actuating at least one resilient member contained in said bearing surface;

the holding bearing surface is an annular groove about the axis;

the holding bearing surface contains a first spring and a second spring, the second spring being stiffer than the first spring, at least one of the first spring and second spring co-operating with means suitable for limiting deformation of the first spring to a predetermined limit value so that rotation of the moving plate takes place against said first spring and second spring in such a manner that:

over a first angular sector the first spring is compressed up to said limit value; and thereafter, over a second angular sector, only the second spring is compressed;

the first spring and second spring are disposed to bear at least indirectly against each other via respective ends;

the means suitable for limiting deformation of the first spring is an arcuate element of developed length substantially equal to the length of the first spring when compressed;

inertial type means for preventing rotation are interposed between the first fixed cheek-plate and the moving plate; and the first fixed cheek-plate has at least one guide track for a rolling member, the side face of the moving plate having at least one cavity disposed so that in a determined relative orientation of the moving plate relative to the first fixed cheek-plate it receives the rolling member in part so as to constitute, in this position, an obstacle to rotation of the moving plate.

5. A method of implementing a device as presented in claim 4, comprising:

wherein the shaft is held fixed in a first position (P1), rotation in a first direction (S1) only being possible from said position (P1), the toothed element being in a first bearing state for its teeth bearing against the ratchet of the first fixed cheek-plate;

wherein at least one movement of the shaft is in a first direction of rotation (S1) from the first position (P1) to an intermediate position contained in a first angular sector, in which intermediate position the toothed element bears against the teeth of the ratchet so that movement of the shaft in the second direction of rotation (S2) is prevented;

wherein at least one movement of the shaft is in the first direction (S1) from any position of the first angular sector towards a predefined position (P3) in which:

the toothed element is spaced apart from the ratchet and is held apart by the abutment bearing against a complementary abutment provided on the resilient part; and the stud is placed at a distance from the cam path;

rotary movement of the shaft in both directions of rotation (S1, S2) being free from said position (P3)' wherein at least one rotary movement of the shaft is in the first direction (S1) from the position (P3) towards a position (P2) in which the toothed element bears against the ratchet;

wherein at least one rotary movement of the shaft is in the first direction (S1) from the position (P2) to a position (P4) in which:

the toothed element is at a distance from the ratchet and is held apart by contact between the abutment and the complementary abutment of the resilient member; and the stud of the toothed element bears against the cam path; and wherein at least a rotary movement of the shaft is in the first direction (S1) from the position (P4) to a locking position (P5) in which the second toothed surface of the toothed element bears against the ratchet.

6. The use of a method as presented in claim 5 to manually adjusting a seat armrest, in particular of a motor vehicle seat.

7. A use according to claim 6, in which:

the position (P1) corresponds to the armrest being in a substantially horizontal situation;

the positions are adjustable tooth by tooth by rotating the shaft over the first angular sector defined by the position (P1) included and the position (P3) excluded, correspond to a plurality of positions in which the armrest is inclined relative to the horizontal, prevention of movement in the direction (S2) enabling the armrest to be leant on in such positions;

the position (P2) corresponds to the armrest being in a substantially vertical situation; and the and positions (P4 and P5) correspond to situations in which the armrest is inclined at an angle of slightly more than 90° relative to the position (P1).

8. A device according to claim 1, further comprising a resilient part mounted on the first fixed cheek plate, said resilient part including an inclining surface causing the toothed element to rock so as to prevent the moving part from turning in one direction of rotation.

9. A device for automatic indexed guidance of a moving part guided about an axis of rotation on a fixed part that is fixed about said axis of rotation, the device comprising:

a toothed element mounted to rock about a rocking axis substantially parallel to the axis of rotation;

a ratchet defining a plurality of abutments for the toothed element, said abutments being angularly disposed around the axis of rotation;

a cam path for controlling rocking movements of the toothed element about its rocking axis during rotation of the moving part; and a first rigid one-piece fixed cheek-plate provided with a plurality of staged surfaces defining
the ratchet,
the cam path, and
at least one bearing surface guiding a moving plate in rotation about the axis of rotation, the moving plate supporting the rocking axis of the toothed element; and
a wherein said moving plate is in the form of a generally disk-shaped part provided with a through hole through which the shaft of the moving part passes and further comprising:
means enabling the moving plate to be prevented from rotating relative to said rotary shaft; and
wherein the moving plate is also provided on a first transverse face with a stud defining the rocking axis of the toothed element.

10. A device according to claim 9, wherein the toothed element is a substantially planar part provided with:
an axial hole enabling said toothed element to be mounted on the stud of the moving plate;
a stud projecting from said first transverse face of said toothed element, said stud forming a cam-follower finger for reading the cam path during rotation of the moving plate relative to the first fixed cheek-plate; and
teeth over at least a first side surface of said toothed element, said teeth being substantially complementary in shape to the teeth of the ratchet of the first fixed cheek plate.

11. A device according to claim 10, wherein the toothed element has an overall plane of symmetry (S), having two toothed surfaces disposed on said first side surface.

12. A device according to claim 1, further comprising a support part about the axis of rotation, the support part being mechanically linked to the moving plate so as to be rotated together therewith during movement of the shaft, said support part supporting a resilient return means for the toothed element.

13. A device according to claim 12, wherein the resilient return means is a flexible blade provided with an abutment, the toothed element being provided with an abutment of complementary shape with respect to said abutment of said resilient return means such that said toothed element can occupy:
a first state in which a first toothed surface of the toothed element bears against the ratchet of the first fixed cheek plate;
a second state in which the toothed element is not in contact with the ratchet, a spacing apart between said toothed element and said ratchet being conserved by reversible locking of the abutment of the toothed element against the abutment of the resilient means; and
a third state in which a second toothed surface of the toothed element bears against the ratchet of the first fixed cheek plate.

14. A device for automatic indexed guidance of a moving part guided about an axis of rotation on a fixed part that is fixed about said axis of rotation, the device comprising:
a toothed element mounted to rock about a rocking axis substantially parallel to the axis of rotation;
a ratchet defining a plurality of abutments for the toothed element, said abutments being angularly disposed around the axis of rotation;
a cam path for controlling rocking movements of the toothed element about its rocking axis during rotation of the moving part;

a first rigid one-piece fixed cheek-plate provided with a plurality of staged surfaces defining
the ratchet,
the cam path, and
at least one bearing surface guiding a moving plate in rotation about the axis of rotation, the moving plate supporting the rocking axis of the toothed element;
further comprising a support part about the axis of rotation, the support part being mechanically linked to the moving plate so as to be rotated together therewith during movement of the shaft, said support part supporting a resilient return means for the toothed element;
wherein the resilient return means is a flexible blade provided with an abutment, the toothed element being provided with an abutment of complementary shape with respect to said abutment of said resilient return means such that said toothed element can occupy;
a first state in which a first toothed surface of the toothed element bears against the ratchet of the first fixed cheek plate;
a second state in which the toothed element is not in contact with the ratchet, a spacing apart between the toothed element and said ratchet being conserved by reversible locking of the abutment of the toothed element against the abutment of the resilient means; and
a third state in which a second toothed surface of the toothed element bears against the ratchet of the first fixed cheek plate; and
further comprising a second fixed cheek plate provided with a through hole enabling the shaft of the moving part to pass therethrough, said second cheek plate being secured to the first fixed cheek plate so as to form a box (BO) in which there is housed a rotary assembly, said rotary assembly comprising:
the moving plate;
the toothed element that rocks on the moving plate about the axis of rotation; and
the support part for supporting the resilient return means.

15. A device according to claim 14, wherein the second fixed cheek plate is snap-fastened onto the first fixed cheek-plate so as to retain said rotary assembly.

16. A device according to claim 14, wherein the first and second fixed cheek-plates are fixed together, further comprising:
wherein the first bearing surface of the first fixed cheek plate guides the support part in rotation about the axis and prevents the support part from moving in translation;
wherein the second bearing surface of the first fixed cheek plate bears against at least a portion of a transverse surface of the toothed element; and
wherein the third bearing surface of the first fixed cheek plate guides the moving plate in rotation about the axis of rotation and prevents the moving plate from moving in translation.

17. A device according to claim 14, wherein the moving plate comprises a stud projecting from a transverse face of said moving plate placed facing the second fixed cheek plate, the stud being received in a holding bearing surface formed in the second fixed cheek-plate, the stud constituting an abutment for actuating at least one resilient member contained in said bearing surface.

18. A device according to claim 17, wherein the holding bearing surface is an annular groove about the axis of rotation.

19. A device according to claim 17, wherein the holding bearing surface contains first and second springs, the second spring being stiffer than the first spring, at least one of the first and second springs co-operating with means for limiting deformation of the first spring to a predetermined limit value so that rotation of the moving plate takes place against said springs in such a manner that:

over a first angular sector the first spring is compressed up to said limit value; and thereafter, over a second angular sector, only the second spring is compressed.

20. A device according to claim 19, wherein said first and second springs are disposed to bear at least indirectly against each other via respective ends.

21. A device according to claim 19, wherein the means suitable for limiting deformation of the first spring is an arcuate element of length substantially equal to the length of the first spring when compressed.

22. A device according to claim 14, wherein inertial type means for preventing rotation are interposed between the first fixed cheek plate and the moving plate.

23. A device according to claim 22, wherein the first fixed cheek-plate has at least one guide track for a rolling member, the side face of the moving plate having at least one cavity disposed so that in a determined relative orientation of the moving plate relative to the first fixed cheek-plate it receives the rolling member in part so as to constitute, in this position, an obstacle to rotation of the moving plate.

24. A device for automatic indexed guidance of a moving part guided about an axis of rotation on a fixed part that is fixed about said axis of rotation, the device comprising:

a toothed element mounted to rock about a rocking axis substantially parallel to the axis of rotation;

a ratchet defining a plurality of abutments for the toothed element, said abutments being angularly disposed around the axis of rotation;

a cam path for controlling rocking movements of the toothed element about its rocking axis during rotation of the moving part;

a first rigid one-piece fixed cheek-plate provided with a plurality of staged surfaces defining
the ratchet,
the cam path, and at least one bearing surface guiding a moving plate in rotation about the axis of rotation, the moving plate supporting the rocking axis of the toothed element; and further comprising a step of holding the shaft fixed in a first position (P1), rotation in a first direction (S1) only being possible from said position (P1), the toothed element being in a first bearing state for its teeth bearing against the ratchet of the first fixed cheek plate.

25. A method according to claim 24, further comprising at least one movement of the shaft in a first direction of rotation (S1) from the first position (P1) to an intermediate position contained in a first angular sector, in which intermediate position the toothed element bears against the teeth of the ratchet so that movement of the shaft in the second direction of rotation (S2) is prevented.

26. A method according to claim 25, further comprising at least one movement of the shaft in the first direction (S1) from any position of the first angular sector towards a predefined position (P3) in which:

the toothed element is held apart from the ratchet by an abutment of said toothed element bearing against a complementary abutment provided on a resilient part; and wherein a stud is placed at a distance from the cam path;

rotary movement of the shaft in both directions of rotation (S1, S2) being free from said predefined position (P3).

27. A method according to claim 26, further comprising at least one rotary movement of the shaft in the first direction (S1) from the predefined position (P3) towards a position (P2) in which the toothed element bears against the ratchet.

28. A method according to claim 27, further comprising at least one rotary movement of the shaft in the first direction (S1) from the position (P2) to a position (P4) in which:

the toothed element is at a distance from the ratchet and is held apart from said ratchet by contact between the abutment of the toothed element and the complementary abutment of the resilient part; and a stud of the toothed element bears against the cam path.

29. A method according to claim 28, further comprising at least a rotary movement of the shaft in the first direction (S1) from the position (P4) to a locking position (P5) in which a second toothed surface of the toothed element bears against the ratchet.

30. The method as presented in claim 24 to manually adjust a seat armrest, in particular of a motor vehicle seat.

31. A method according to claim 20, wherein:

the position (P1) corresponds to the seat armrest being in a substantially horizontal situation;

a plurality of positions which are adjustable tooth by tooth by rotating the shaft over the first angular sector defined by the position (P1) included and the position (P3) excluded, correspond to a plurality of positions in which the armrest is inclined relative to the horizontal, prevention of movement in the direction (S2) enabling the armrest to obtain the positions in which the armrest is inclined relative to the horizontal;

the position (P2) corresponds to the armrest being in a substantially vertical situation; and the positions P4 and P5 correspond to positions in which the armrest is inclined at an angle of slightly more than 90° relative to the position (P1).

* * * * *

UNITED STATES PATENT AND TRADEMARK OFFICE
CERTIFICATE OF CORRECTION

PATENT NO. : 6,609,758 B1
DATED : August 26, 2003
INVENTOR(S) : Marc Lefevere

It is certified that error appears in the above-identified patent and that said Letters Patent is hereby corrected as shown below:

Title page,
Item [57], ABSTRACT,
Line 11, "firs" should read -- first --;

Column 11,
Line 20, "rotation fixed part" should read -- rotation on a fixed part --;
Line 26, "rotation; and" should read -- rotation; --;

Column 12,
Line 35, "rotating" should read -- rotation --; and

Column 18,
Line 36, "20" should read -- 30 --.

Signed and Sealed this

Twenty-second Day of June, 2004

JON W. DUDAS
*Acting Director of the United States Patent and Trademark Office*